(12) United States Patent
Aoyagi

(10) Patent No.: US 10,607,643 B2
(45) Date of Patent: Mar. 31, 2020

(54) MAGNETIC DISK DEVICE AND RECORDING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yuka Aoyagi, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 16/120,292

(22) Filed: Sep. 2, 2018

(65) Prior Publication Data

US 2019/0287559 A1    Sep. 19, 2019

(30) Foreign Application Priority Data

Mar. 16, 2018   (JP) .................................. 2018-050145

(51) Int. Cl.
G11B 5/09       (2006.01)
G11B 5/58       (2006.01)
G11B 5/48       (2006.01)
G11B 5/012      (2006.01)

(52) U.S. Cl.
CPC .............. G11B 5/58 (2013.01); G11B 5/012 (2013.01); G11B 5/4886 (2013.01)

(58) Field of Classification Search
None
See application file for complete search history.

(56) References Cited

U.S. PATENT DOCUMENTS

| | | | | |
|---|---|---|---|---|
| 5,677,900 A | * | 10/1997 | Nishida | G11B 20/1209 360/13 |
| 6,104,579 A | * | 8/2000 | Kamoshita | G11B 5/012 360/135 |
| 6,330,133 B1 | * | 12/2001 | Samuelson | G11B 5/6005 360/234.3 |
| 6,366,416 B1 | * | 4/2002 | Meyer | G11B 33/10 324/212 |
| 6,473,259 B1 | * | 10/2002 | Kuo | G11B 5/60 360/294.7 |
| 6,952,330 B1 | * | 10/2005 | Riddering | G11B 5/4826 360/245.3 |
| 7,486,465 B2 | | 2/2009 | Kondo | |
| 8,824,091 B2 | | 9/2014 | Contreras et al. | |
| 2009/0237842 A1 | * | 9/2009 | Ehrlich | G11B 5/012 360/240 |

FOREIGN PATENT DOCUMENTS

JP    2010-019771 A    1/2010

* cited by examiner

*Primary Examiner* — Peter Vincent Agustin
(74) *Attorney, Agent, or Firm* — Kim & Stewart LLP

(57) ABSTRACT

A magnetic disk device includes a magnetic head that writes data on and reads data from the magnetic disk, and a controller circuit. The controller circuit is configured to control a gap between the magnetic head and the magnetic disk, and select one of two or more gap values for the fly height, based on a write location in the magnetic disk of data to be written by the magnetic head.

18 Claims, 4 Drawing Sheets

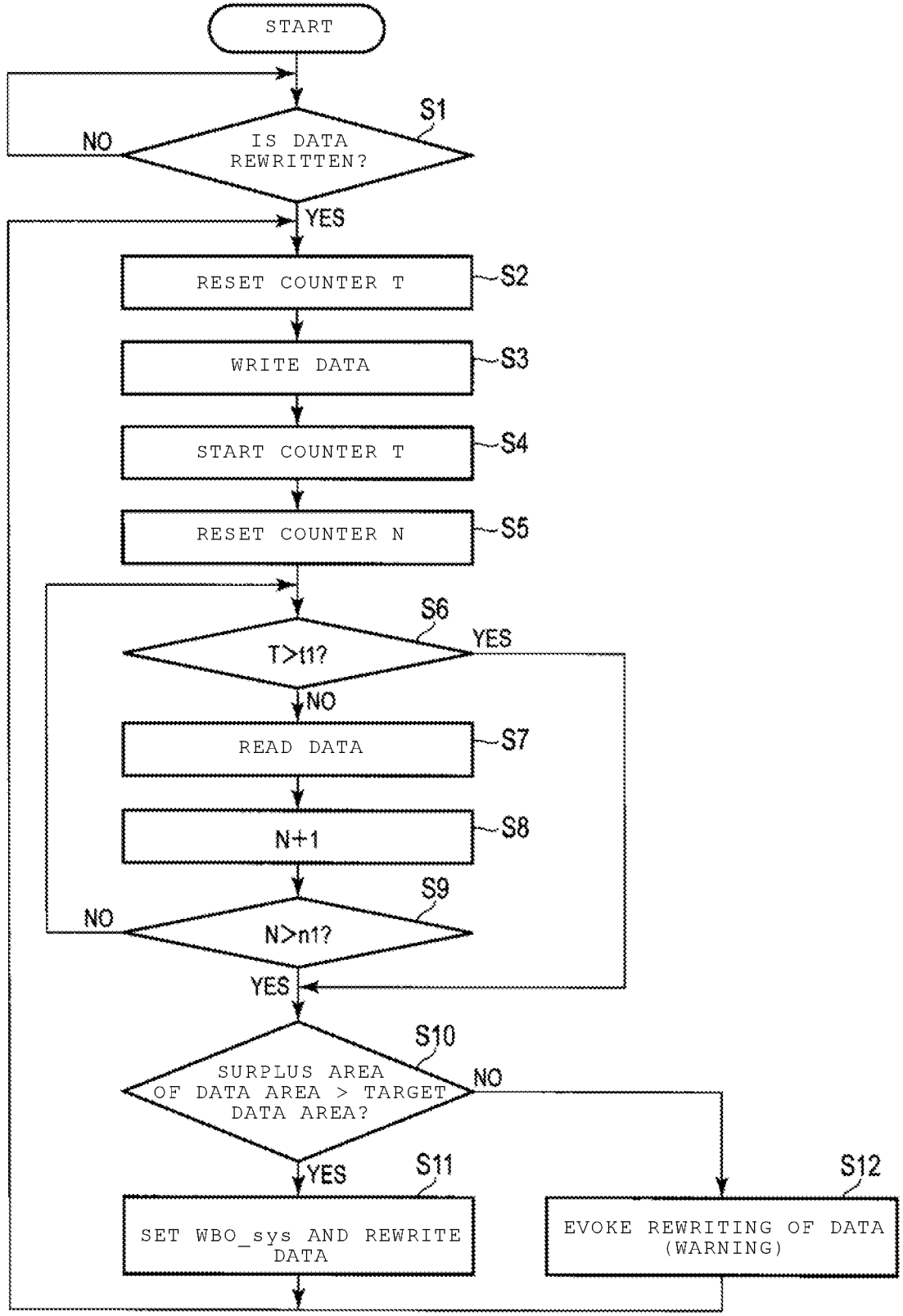

MAGNETIC DISK DEVICE AND RECORDING METHOD

CROSS-REFERENCE TO RELATED APPLICATIONS

This application is based upon and claims the benefit of priority from Japanese Patent Application No. 2018-050145, filed Mar. 16, 2018, the entire contents of which are incorporated herein by reference.

FIELD

Embodiments described herein relate generally to a magnetic disk device and a recording method.

BACKGROUND

A magnetic disk device has a dynamic fly height (DFH) function for controlling a fly height of a magnetic head over a recording surface of a magnetic disk which is a magnetic media. Typically, the DFH function changes a voltage applied to a DFH element (a thermal actuator) included in the magnetic head. The DFH function is used for DFH control in which the magnetic head is raised to a fly height position for seeking while the magnetic head is seeking and drops to a different fly height position for writing and reading prior to the seeking being completed.

However, in DFH control of the magnetic disk device of the related art, the fly height from the magnetic medium is switched before and after the seeking is made, and the fly height is fixed during the writing and reading of data.

DESCRIPTION OF THE DRAWINGS

FIG. 5 is a flowchart of a backup recording operation, according to a second embodiment.

DETAILED DESCRIPTION

Figure 1:
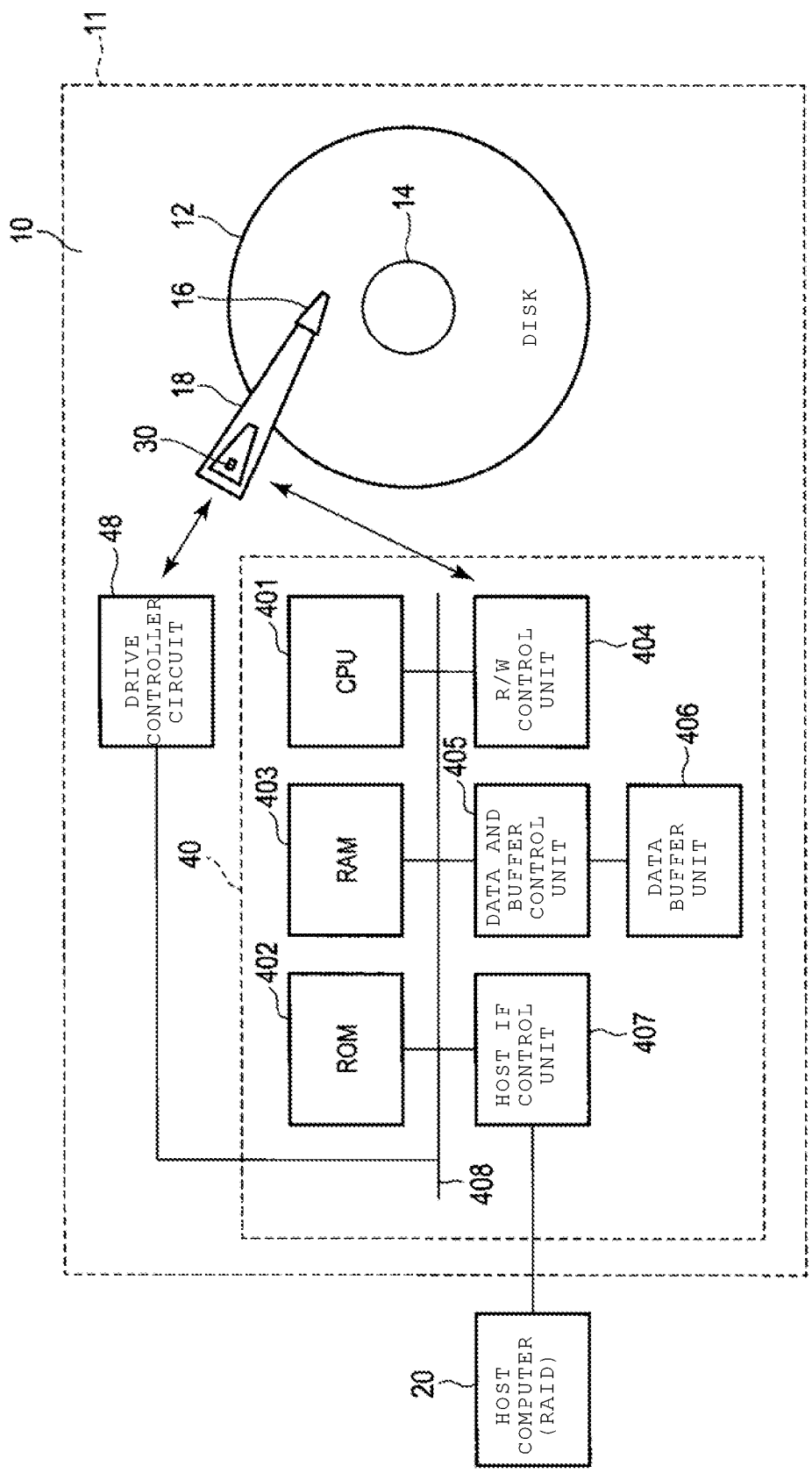
FIG. 1 is a block diagram schematically illustrating a magnetic disk device according to an embodiment.

Embodiments provide a magnetic disk device and a data recording method that can improve writing quality of data by using a DFH function.

In general, according to one embodiment, a magnetic disk device includes a magnetic disk, a magnetic head that writes data on and reads data from the magnetic disk, and a controller circuit. The controller circuit is configured to control a gap between the magnetic head and the magnetic disk, and select one of two or more gap values for the fly height, based on a write location in the magnetic disk of data to be written by the magnetic head.

Hereinafter, an embodiment will be described with reference to the drawings.

It is noted that the disclosure is merely an example, and the scope of the present disclosure includes other embodiments that those skilled in the art can easily generate by modifying the gist of the present disclosure. In addition, in order to make the description clearer, the drawings may be schematically illustrated in terms of a width, a thickness, a shape, and the like of each part as compared with the actual form, but each drawing is only an example, and is not intended to limit the interpretation of the present disclosure. In addition, in the specification and each drawing, the same reference numerals or symbols are associated with similar elements as the elements described with reference to preceding drawings, and the detailed description thereof may be omitted for clarity and brevity.

A configuration of a magnetic disk device (Hard Disk Drive: HDD) according to the embodiment will be described with reference to FIGS. 1 to 5.

FIG. 1 is a block diagram schematically illustrating a magnetic disk device (HDD) according to an embodiment. The HDD 10 illustrated in FIG. 1 includes a housing 11, a magnetic medium 12 which is a recording medium disposed in the housing 11, a spindle motor 14 that supports the magnetic medium 12 and rotates, and a plurality of magnetic heads 16 that record and reproduce data on and from the magnetic medium 12. The HDD 10 also includes a head actuator 18 that moves the magnetic head 16 over a selected random track on the magnetic medium 12 and positions the magnetic head 16 relative the selected track. While not illustrated in detail, the head actuator 18 includes a suspension assembly that supports the magnetic head 16 in a movable manner, a voice coil motor (VCM) that rotates the suspension assembly, and a DFH element that controls a fly height of the magnetic head 16.

The HDD 10 includes a head amplifier 30, a main controller circuit 40, and a drive controller circuit 48. The head amplifier 30 is included, for example, in a suspension assembly of the head actuator 18 and is electrically connected to the magnetic head 16. The main controller circuit 40 and the drive controller circuit 48 are configured, for example, on a control circuit board (not illustrated) that is disposed on a rear side of the housing 11. The main controller circuit 40 includes an arithmetic processor (also referred to as a central processing unit, or CPU) 401, a read only memory (ROM) 402 for storing a program, a random access memory (RAM) 403 for data processing work, a read and write (R/W) control unit 404, a data and buffer control unit 405, a data and buffer unit 406, and a host interface (IF) control unit 407, all of which are connected to each other via a bus 408. The main controller circuit 40 is electrically connected to the head actuator 18 and is also electrically connected to the VCM, the spindle motor, and the DFH element via the drive controller circuit 48. In addition, in some embodiments, the main controller circuit 40 can be connected to a host computer (such as a RAID controller) 20 under the control of the host IF control unit 407.

The main controller circuit 40 generates information regarding one or more media bumps or other protrusions on the recording surface of the magnetic medium 12, and holds such information in the RAM 403 as media bump information. The main controller circuit 40 switches a fly height of the magnetic head 16 from a standby fly height to a seek fly height when seeking of the magnetic head 16 is performed, such as when the magnetic head 16 is moved from the end position of a writing and/or reading operation to a start position of a subsequent writing and/or reading operation. The main controller circuit further causes a DFH control to be switched to the fly height for writing and/or reading operations before a writing and/or reading operation is performed. Furthermore, in DFH control according to the present embodiment, two set values of the writing fly height are employed when a recording operation is performed. A first set value of a low fly height is used when data, such as user data, is being written, and a second set value of a higher fly height is used when data being stored in a system area is being written. The system area includes one or more regions on the magnetic medium 12 that are reserved for the storage of parameters employed in the operation of the HDD 10 and/or other system information. The system area generally stores no user data. In some embodiments, the system area is located on an outer edge of the magnetic medium 12 and includes a plurality of reserved cylinders or tracks. In some embodiments, the system area also includes tracks or cylinders located on the innermost region of the magnetic medium 12 or some other portion of the magnetic medium 12, and can include copies of the parameters and other system data stored in other regions of the system area.

In the above configuration, a processing operation according to a first example will be described with reference to FIGS. 2 to 4B.

(1) First Example

Figure 2:
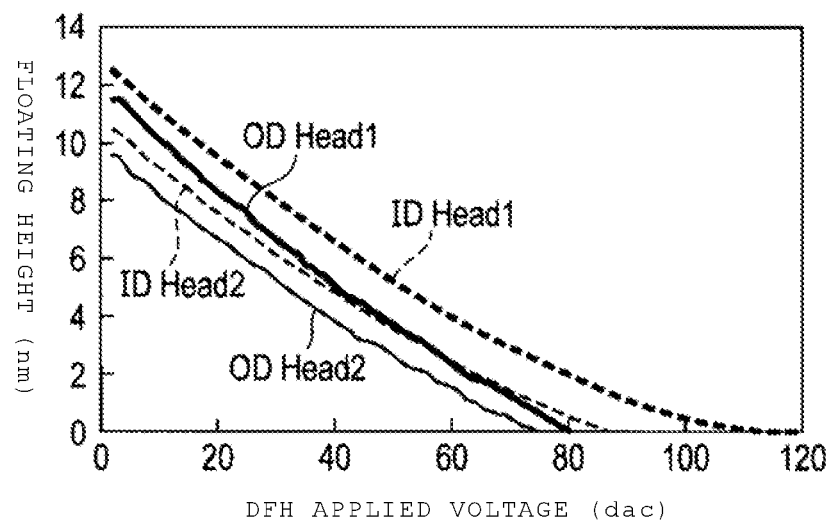
FIG. 2 is a graph illustrating a relationship between an application voltage of a DFH element and magnetic spacing, according to a first example.

As described above, in the HDD 10, a magnetic head having a DFH function performs recording (writing) and reproduction (reading) of data on the magnetic medium 12. By changing a voltage applied to a DFH element, a fly height from the magnetic medium 12 can be changed. A relationship between an applied voltage (DFH applied voltage [DAC counts]) of the DFH element and magnetic spacing (fly height [nm]) is illustrated in FIG. 2 (FIG. 2 illustrates characteristics of a: OD head1, b: OD head2, c: ID head1, and d: ID head2). In FIG. 2, a position where the magnetic spacing is "0" is assumed for when roughness of the magnetic medium is average (Ra). A backoff amount set at the time of writing and reading (WBO_data, RBO_data, respectively) is a value obtained by adding variation in a fly height control amount from a surface of the magnetic medium 12, an air bearing surface (ABS) processing intersection, a head gimbal assembly (HGA) attachment intersection, and the like. Fly height control is performed when data is written and read by applying the DFH application voltage equal to the set amount.

The magnetic spacing influences writing quality of data, and can improve the writing quality of data by being reduced to as small a value as possible. Therefore, whether or not writing of the data is correctly performed is verified after the data is written, for example by the main controller circuit 40. Therefore, when data cannot be correctly written, for example due to an abnormal bump, data can be correctly written by writing the data on another cylinder, track, or the like, again.

For example, when writing data, by setting the backoff amount (WBO_data) to 1.0 nm and the backoff amount at the time of reproduction (RBO_data) to 1.5 nm, it is possible to avoid a head disk interface (HDI) failure when reading and to maintain high writing quality of the data.

Figure 3:
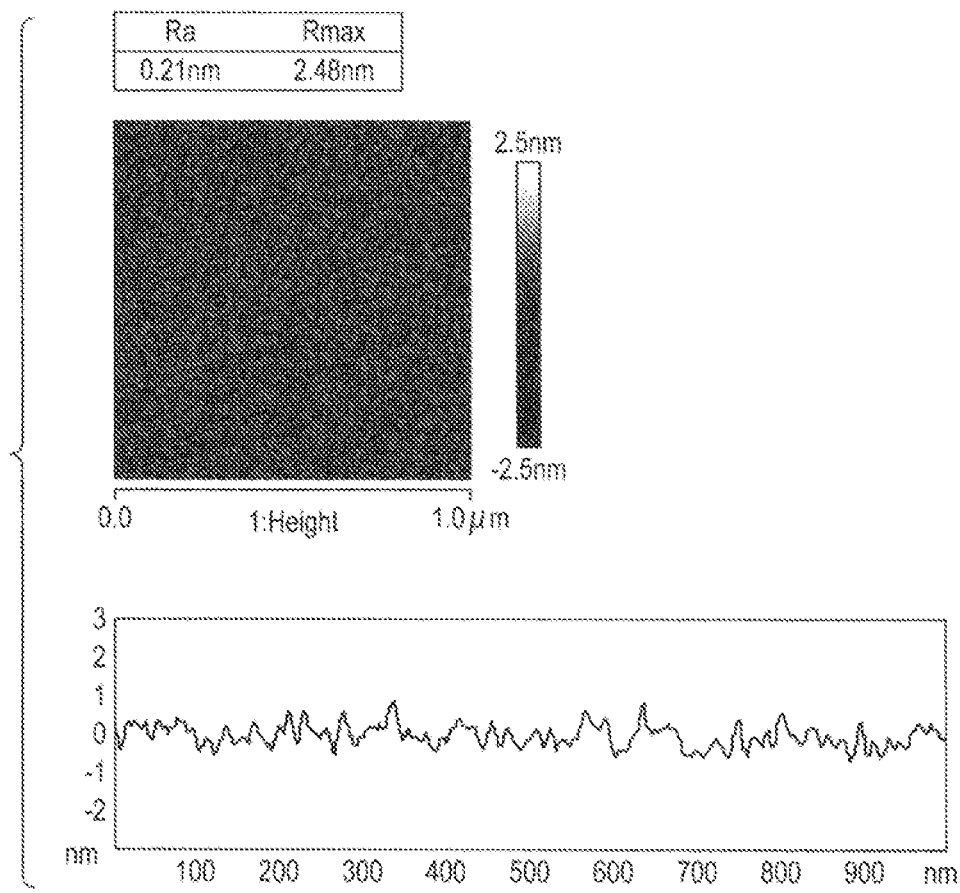
FIG. 3 is a diagram illustrating roughness of a surface of a magnetic medium, according to the first example.

However, as illustrated in FIG. 3, a surface of the magnetic medium is not smooth relative to the above-described backoff amounts, and varies around an average Ra. In the example illustrated in FIG. 3, the average Ra is 0.21 nm, σ is 0.5 Å, and a maximum surface roughness (Rmax) is 2.48 nm. Thus, it is preferable to write by increasing the fly height in an area where a writing failure is not allowed, or cannot be tolerated, such as in the system area. Writing errors due to an abnormal bump can be prevented by setting the fly height to a value obtained by adding roughness 3σ of the surface of the magnetic medium 12 to WBO_data. Accordingly, it is possible to ensure a much more reliable writing of data to the magnetic medium 12.

Specifically, for example, assuming a case where the WBO_data is 1.0 nm, the RBO_data is 1.5 nm, and the roughness of the surface of the magnetic medium 12 is 3σ as described above, the backoff amount (WBO_sys) at the time of writing in the system area can be calculated as follows.

$$WBO\_sys = WBO\_data + 3\sigma$$
$$= 1.0 + 3 \times (0.5/10)$$
$$= 1.15 \text{ nm}$$

Meanwhile, the writing quality of data is decreased by increasing the fly height during writing. Accordingly, in order to improve the writing quality of data when writing at an increased fly height, the bytes per inch (BPI) and tracks per inch (TPI) can be decreased (i.e., the areal density of stored data is decreased) and a writing current for writing data can be increased. Thereby, it is possible to perform writing in the system area without a significant reduction in quality of the written data.

In addition, in some embodiments, the value of WBO_sys may be increased to more than a value of WBO_data+3σ, as described above. In such embodiments, when writing is performed by increasing WBO_sys in this way, reliability can be further improved by including a step of verifying that writing of the data is correct after data has been written. For example, in one specific example of increases WBO_sys, $$WBO\_sys = WBO\_data + 3\sigma(Rmax - Ra)$$
$$= 1.0 + 3 \times (0.5/10) \times (2.48 - 0.21)$$
$$= 1.34 \text{ nm}$$

However, as noted above, when the backoff amount changes, changing the BPI so as to maintain the recording quality of data can also be performed. Therefore, a relationship between a backoff change amount and a BPI change amount will be described below.

Figure 4A:
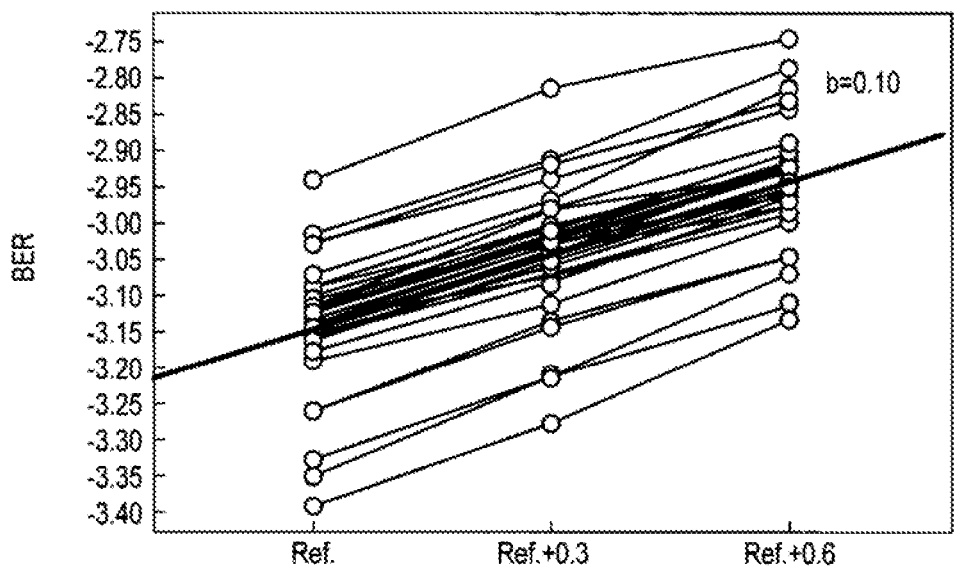
FIGS. 4A and 4B are graphs illustrating a relationship between a backoff change amount and a BPI change amount, according to the first embodiment.
Figure 4B:
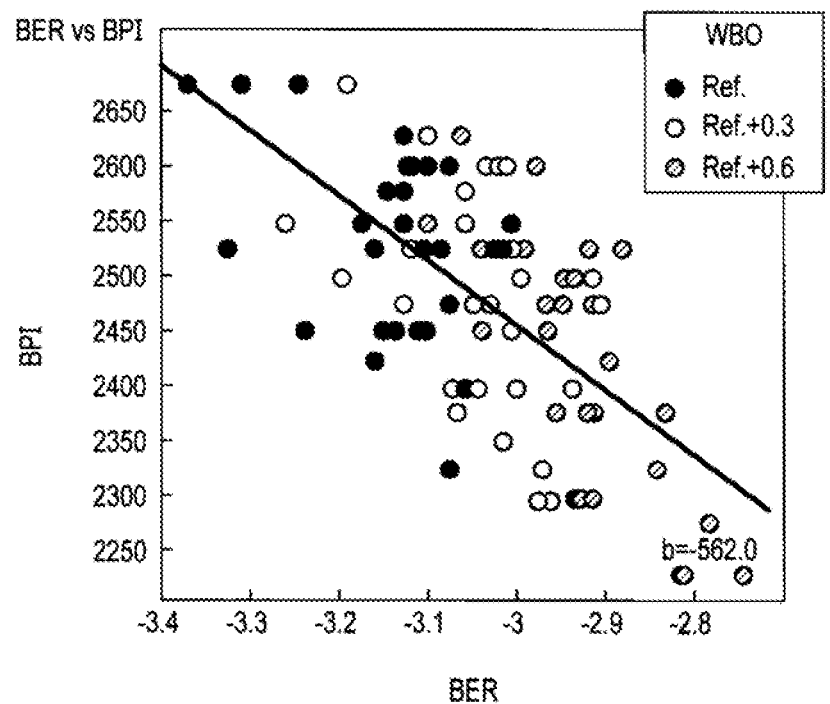

As illustrated in FIG. 4A, when back off (BO) changes, a bit error rate (BER) changes. When the amount of change in BO is calculated from an average measured from a plurality of units, a soft output Viterbi algorithm (SOVA) changes by 0.1 digit for a BO amount of 0.3 nm. FIG. 4B illustrates a relationship between the BER and a specific BPI. As shown, the BER becomes worse as the BPI becomes increases, and the amount of change indicated by an average correlation line obtained by measuring the plurality of units is a change of 56 [kBPI] for a BER change of 0.1 digit. The amount of change obtained for a BO change of 1 [nm], is 187 [kBPI].

In light of the above description, it is possible to maintain the recording quality of the system area by maintaining a certain relationship between the BPI of the system area and the BPI of the user data recording area. Specifically, when the maximum recording density of the system area is referred to as BPI_WBO_sys and the maximum recording density of the user data recording area is referred to as BPI_WBO_data, the relationship between the BPI of the system area and the BPI of the user data recording area is satisfied when the following equation is satisfied, BPI_WBO_sys ≤ BPI_WBO_data−(WBO_sys−WBO_data)×187 [kBPI]

In the above embodiment, a factor indicating a recording density associated with a targeted bit error rate for the HDD 10 is equal to 187 kBPI. In other embodiments, the factor can vary for different configurations of HDD 10 between about 100 and about 300 kBPI.

(2) Second Example

In the first example, a method of changing WBOs of the system area and the user data recording area as WBO settings for the two levels is described. WBO_sys can also be used when long-term storage data is recorded for backup in a surplus area of the magnetic medium 12. FIG. 5 illustrates a flowchart of a backup recording operation according to a second example.

First, the main controller circuit 40 includes an elapse time counter T that counts elapsed time from a start time when data is written for each cylinder, and a read number counter N that counts the number of times that data is read from each cylinder. The main controller circuit 40 monitors rewriting of input data, such as writing data to a particular track or cylinder (step S1), resets the elapsed time counter T to "0" when there data is written to or rewritten to the track or cylinder (step S2), and starts the writing of data to the track or cylinder (step S3). Counting of the elapsed time counter T is started, and elapsed time of the elapsed time counter T is updated. For example, data associated with the elapsed time counter T can be overwritten to a portion a memory where the time indicating when the data is written is stored (step S4). At this point in time, the reading number counter N is reset to "0" (step S5).

Thereafter, the value of elapsed time T is monitored to determine whether or not the elapsed time T reaches a time threshold value t1 (step S6). When T>t1, the written data is read (step S7), and the value of N is incremented by 1 (step S8). Here, the value of the reading number counter N is monitored to determine whether or not the number of times the data are read (i.e., the value of the reading number counter N) reaches the read number threshold value n1 (step S9). When N>n1 is not satisfied, the processing returns to step S6, and when N>n1, the processing proceeds to step S10. In step S6, when T>t1, the processing proceeds to step S10.

In step S10, the surplus area of the magnetic medium 12, which can be included in the user data recording area, is compared with the data area (hereinafter referred to as the "target data area") necessary for storing the data for which the reading number counter N reaches or exceeds the read number threshold value n1. For example, the target data area may be measured in tracks, sectors, or the like. When the surplus area is greater than the size of the target data area, WBO_sys is employed to rewrite the data for which the reading number counter N reaches or exceeds the read number threshold value n1 (step S11), and the processing returns to step S2 and waits for the next rewriting of data. In addition, in step S10, when the surplus area is smaller than the target data area, data for which the reading number counter N reaches or exceeds the read number threshold value n1 is not rewritten. Instead, a warning for evoking data rewriting is output (step S12).

That is, in the herein described backup recording operation of FIG. 5, the elapsed time counter T and the reading number counter N are each reset to "0", and both counters T and N are monitored at a respective predetermined time. When the current value of the elapsed time counter T is large and the current value of the reading number counter N is large, it means that the data is accessed frequently but rewriting of the data is not performed. When the current value of the elapse time counter T exceeds the threshold value t1 and the current value of the reading number counter N exceeds the read number threshold value n1, the surplus area is checked as to whether or not the data written in this area can be rewritten to the surplus area.

When sufficient surplus area is available, rewriting of the data in the surplus area is performed by using the fly height setting of WBO_sys, so that the data are more reliably written to the magnetic medium 12. During the rewriting of the data in the surplus area, a rewriting completion flag is set to "0", and a rewriting completion flag is set to "1" after the rewriting is completed. When data access is made during the rewriting, data before the rewriting is read. That is, the original data that are located in the user data recording area are read and not the partially rewritten data. When a data access is made after the rewriting is completed, the rewritten data is read. After the rewriting completion flag is set to "1" and the step of confirming whether or not the data writing has been correctly completed, the original area in the user data recording area that stored the original data is released for other use. In addition, when the original data has not been correctly written in the surplus area, a warning or other notification indicating "data backup has failed" is output from the system. In this way, it is possible to inform a user to retry a back up the original data in this surplus area or by some other means. By implementing the above backup recording operation, although reading of the data in the surplus area is frequently performed, it is possible to ensure the writing quality of data without rewriting the data.

As described above, in the HDD according to the present embodiment, data writing can be performed by increasing a fly height in an area where avoidance of writing errors, such as a system area is required. Writing errors or other data loss due to interactions with abnormal bumps can be prevented, and thus, it is possible to obtain very high reliability of written data. As the fly height increases, recording quality of data decreases. However, decreasing BPI and TPI and increasing a current while writing data at the higher fly height, writing data in the system area can be performed without significantly reducing the recording quality of data. In addition, by including a step of verifying whether or not writing of the data is correct after the data is recorded, reliability can be further improved. Furthermore, by making the maximum recording density of the system area sufficiently smaller than the maximum recording density of the user data recording area, the written data quality of the system area can be maintained.

In addition, when frequent access to certain data is made but rewriting of that data is not performed, the surplus area is checked as to whether or not rewriting of such data to the surplus area can be performed. When there is sufficient surplus area available, rewriting of such data is performed by using fly height setting of WBO_sys. When there is insufficient surplus area and therefore rewriting of the data cannot be performed, a warning is output from the system and data backup of the data is indicated. Thus, it is possible to maintain the writing quality of the data in which read frequency is high, but rewriting is not performed after a certain period of time elapses since the writing of the data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head that writes data on and reads data from the magnetic disk; and
   a controller circuit configured to:
      control a gap between the magnetic head and the magnetic disk,
      select a first gap value for the gap when a write location in the magnetic disk of data to be written by the magnetic head is a user data recording area,
      count a number of times that the data written to the write location has been read, and
      when the number of times that the data written to the write location has been read reaches a specified value, rewrite the data written to the write location to a surplus area of the magnetic disk with the gap set at a second gap value that is greater than the first gap value.

2. The magnetic disk device according to claim 1,
   wherein the control circuit is further configured to select the second gap value for the gap when the write location of the data is a system area.

3. The magnetic disk device according to claim 2,
   wherein a difference between the first gap value and the second gap value is equal to or greater than 15 nm.

4. The magnetic disk device according to claim 2,
   wherein, when the second gap value for the gap is selected, the controller circuit increases a current during writing by the magnetic head.

5. The magnetic disk device according to claim 2,
   wherein the controller circuit is configured to, after data has been written to the write location, verify whether or not the data written to the write location has been written correctly.

6. The magnetic disk device according to claim 1, wherein the controller circuit is further configured to count the number of times within a predetermined time after the data have been written to the write location.

7. The magnetic disk device according to claim 1,
   wherein when the number of times reaches the specified value, the controller circuit:
   determines whether or not the recorded data written to the write location can be rewritten to the surplus area, and
   outputs a notification when the surplus area has insufficient capacity to store the data written to the write location.

8. The magnetic disk device according to claim 2,
   wherein, when the second gap value for the gap is selected, the controller circuit decreases at least one of a bytes per inch (BPI) and a tracks per inch (TPI) of the data while writing the data to the write location by the magnetic head.

9. The magnetic disk device according to claim 2,
   wherein the first gap value and the second gap value are selected so that a maximum recording density of the system area is less than or equal to a maximum recording density of the user data recording area minus a recording density associated with a targeted bit error rate for the disk device times a difference between the second gap value and the first gap value.

10. The magnetic disk device according to claim 9,
    wherein the recording density associated with the targeted bit error rate has a value between about 100 kilobytes per inch and about 300 kilobytes per inch.

11. A method of storing data in a magnetic disk device that includes a magnetic head that writes data to and reads data from a magnetic disk, the method comprising:
    selecting a first gap value for a gap between the magnetic head and the magnetic disk when a write location in the magnetic disk of data to be written by the magnetic head is a user data recording area;
    controlling the gap of the magnetic head from the magnetic disk at the selected gap value;
    counting a number of times that the data written to the write location has been read; and
    when the number of times that the data written to the write location has been read reaches a specified value, rewriting the data written to the write location to a surplus area of the magnetic disk with the gap set at a second gap value that is greater than the first gap value.

12. The method according to claim 11, further comprising:
    selecting the second gap value for the gap when the write location of the data is a system area.

13. The method according to claim 11,
    wherein a difference between the first gap value and the second gap value is equal to or greater than 15 nm.

14. The method according to claim 12,
    further comprising, when the second gap value for the gap is selected, increasing a current during writing by the magnetic head.

15. The method according to claim 11,
    further comprising, after the data has been written to the write location, verifying whether or not the data written to the write location has been written correctly.

16. The method according to claim 11, further comprising:
    counting the number of times within a predetermined time after the data have been written to the write location.

17. The method according to claim 11, further comprising:
    when the number of times reaches the specified value, determining whether or not the recorded data written to the write location can be rewritten to the surplus area, and outputting a notification when the surplus area has insufficient capacity to store the data written to the write location.

18. The method according to claim 12, further comprising:
    when the second gap value for the gap is selected, decreasing at least one of a bytes per inch (BPI) and a tracks per inch (TPI) of the data while writing the data to the write location by the magnetic head.

* * * * *